Figure 1:
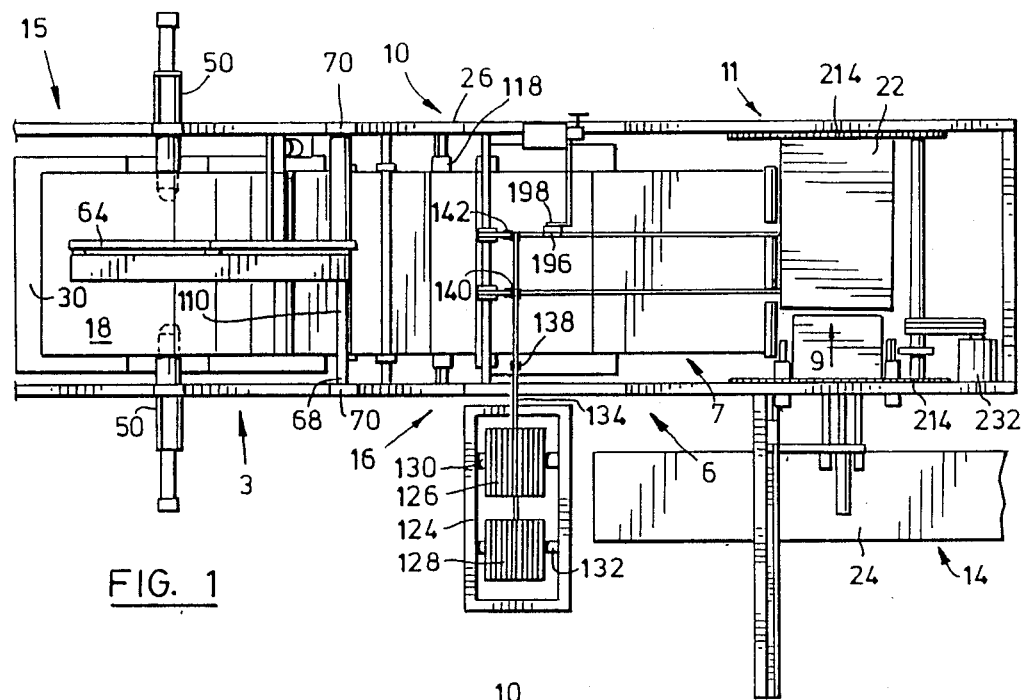

United States Patent [19]

Langen et al.

[11] Patent Number: 4,872,301

[45] Date of Patent: Oct. 10, 1989

[54] PACKAGING MACHINERY AND A METHOD OF MAKING A WRAP-AROUND SHIPPER PACKAGE

[75] Inventors: Marinus J. M. Langen, Toronto; Peter Guttinger, Rexdale; Mihai M. Borza, North York, all of Canada

[73] Assignee: H. J. Langen & Sons Limited, Mississauga, Canada

[21] Appl. No.: 206,039

[22] Filed: Jun. 13, 1988

[51] Int. Cl.⁴ .................... B65B 9/10; B65B 61/18
[52] U.S. Cl. .................................. 53/133; 53/210; 53/575; 53/589
[58] Field of Search ............. 53/133, 575, 588, 589, 53/210, 456

[56] References Cited

U.S. PATENT DOCUMENTS

| | | | |
|---|---|---|---|
| 2,624,990 | 1/1953 | Allen | 53/589 X |
| 3,665,845 | 5/1972 | Lyon | 53/589 X |
| 3,879,920 | 4/1975 | Langen | 53/575 X |
| 4,044,528 | 8/1977 | Black | 53/575 |
| 4,406,728 | 9/1983 | Ohba | 53/589 X |
| 4,593,518 | 6/1986 | Lancaster | 53/588 X |

Primary Examiner—John Sipos
Attorney, Agent, or Firm—Fetherstonhaugh & Co.

[57] ABSTRACT

A packaging machine for wrapping a flexible web around an assembled load in a wrapping station consists of a wrapping mandrel which is located in the wrapping station and a web dispenser for dispensing a web into the wrapping station and a wrapper mechanism which grasps the leading end of the web and pulls it around the mandrel. The web is cut after it has been wrapped around the mandrel. The dispenser mechanism which dispenses a web of flexible material from a coil includes a coil support and a belt drive which engages the coil and serves to rotatably drive the coil to dispense the web from the coil support. The shipper package which is formed in the machine consists of an assembled load and a wrapper which is wrapped around the assembled load. A first tear tape is attached to the outer face of the web and a second tear tape is attached to the inner face of the web in an underlying relationship with respect to the first tear tape. The second tear tape is narrower than the first tear tape such that when the second tear tape is pulled it will tear the package along tear lines which will follow the side edges of the second tape to provide a controlled tear propagation.

26 Claims, 13 Drawing Sheets

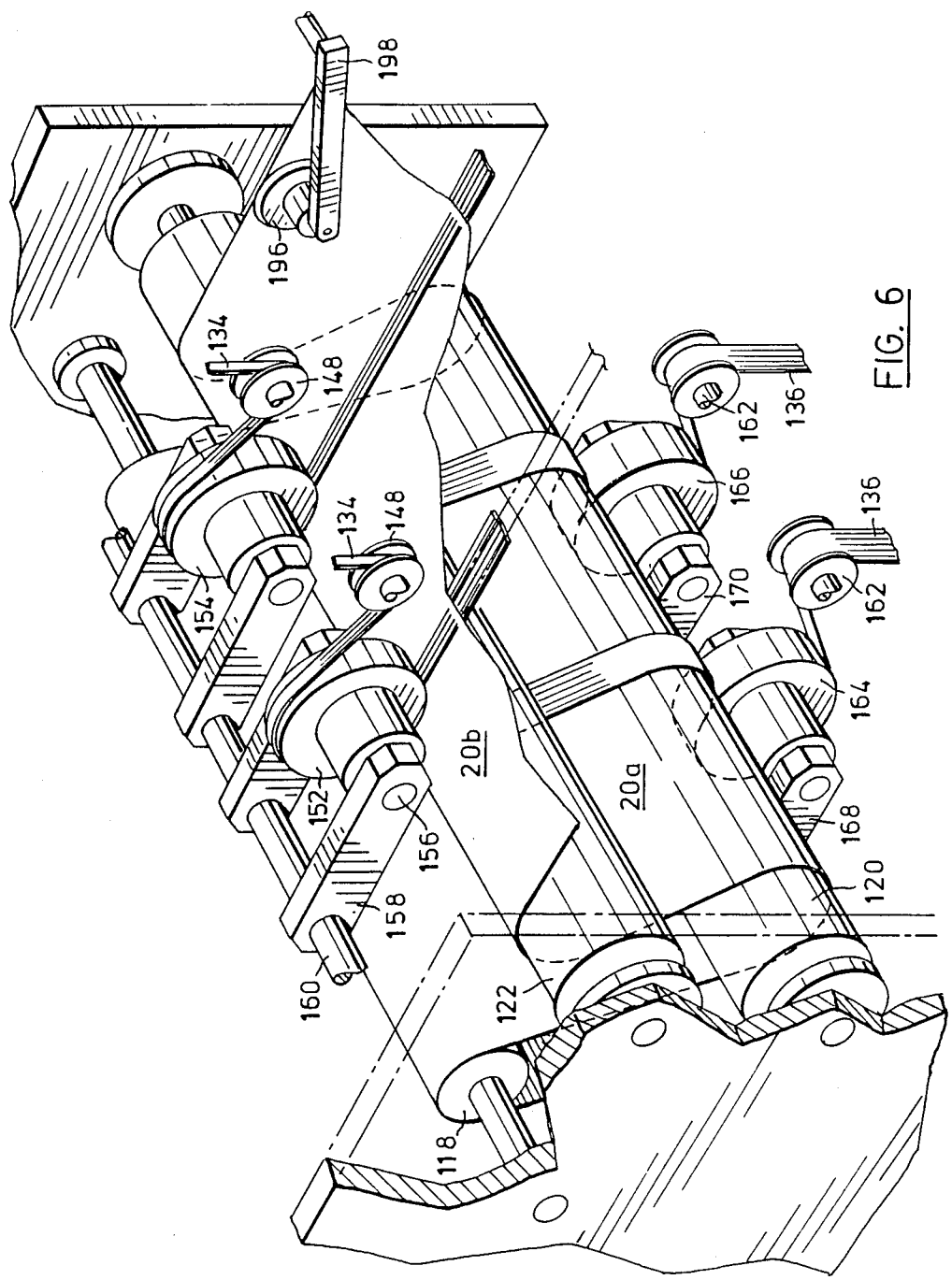

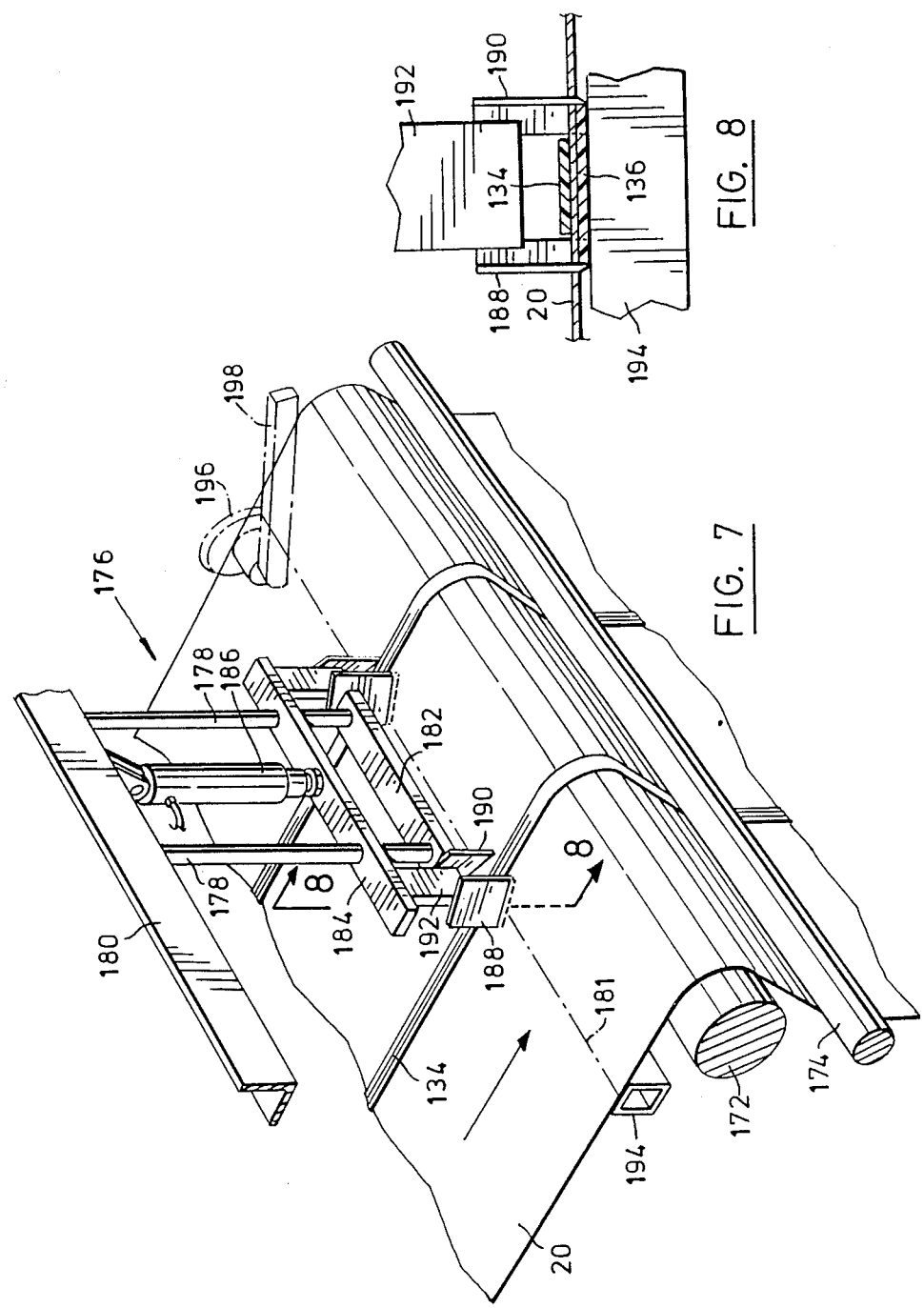

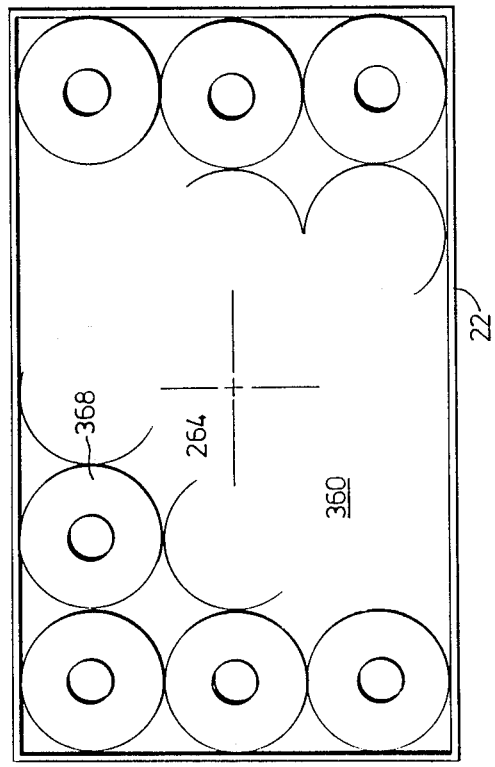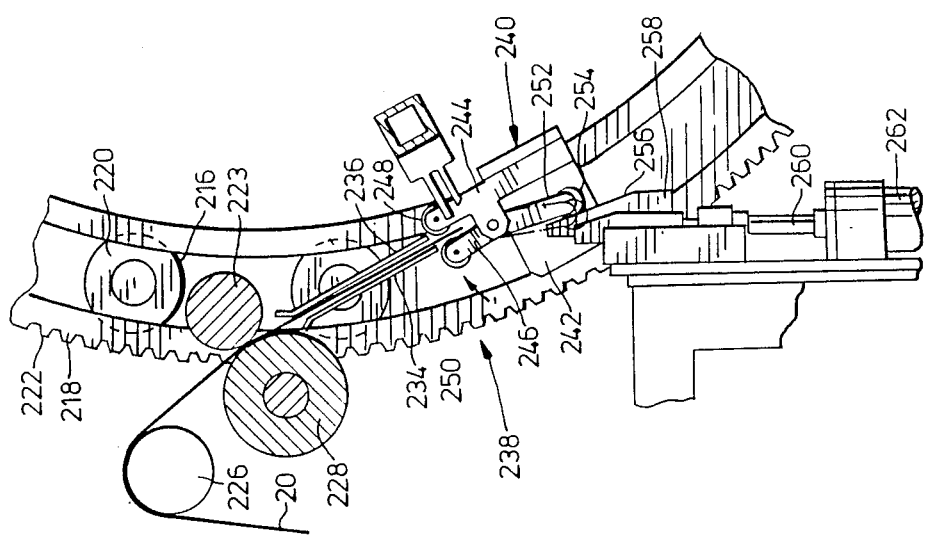
FIG.9

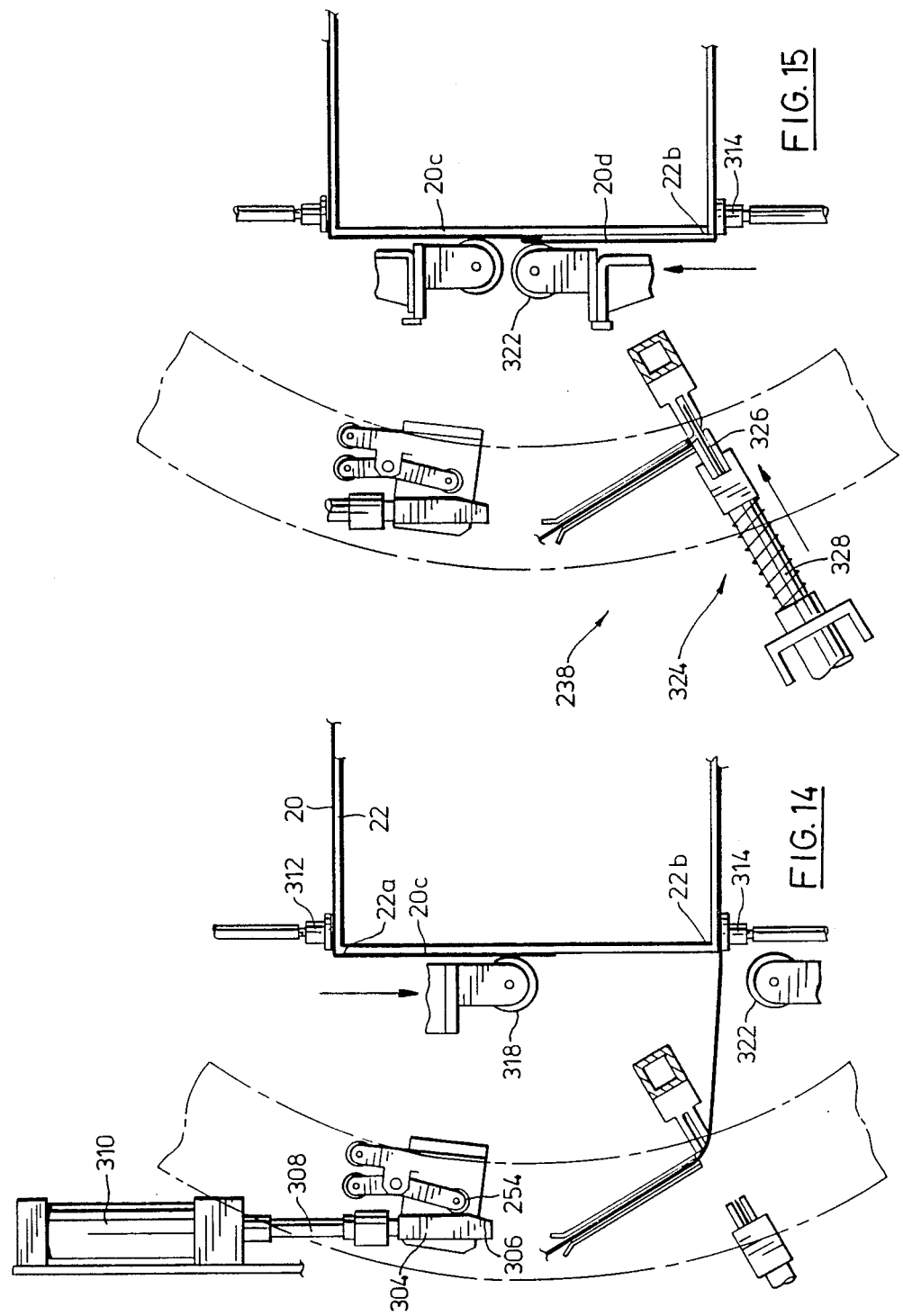

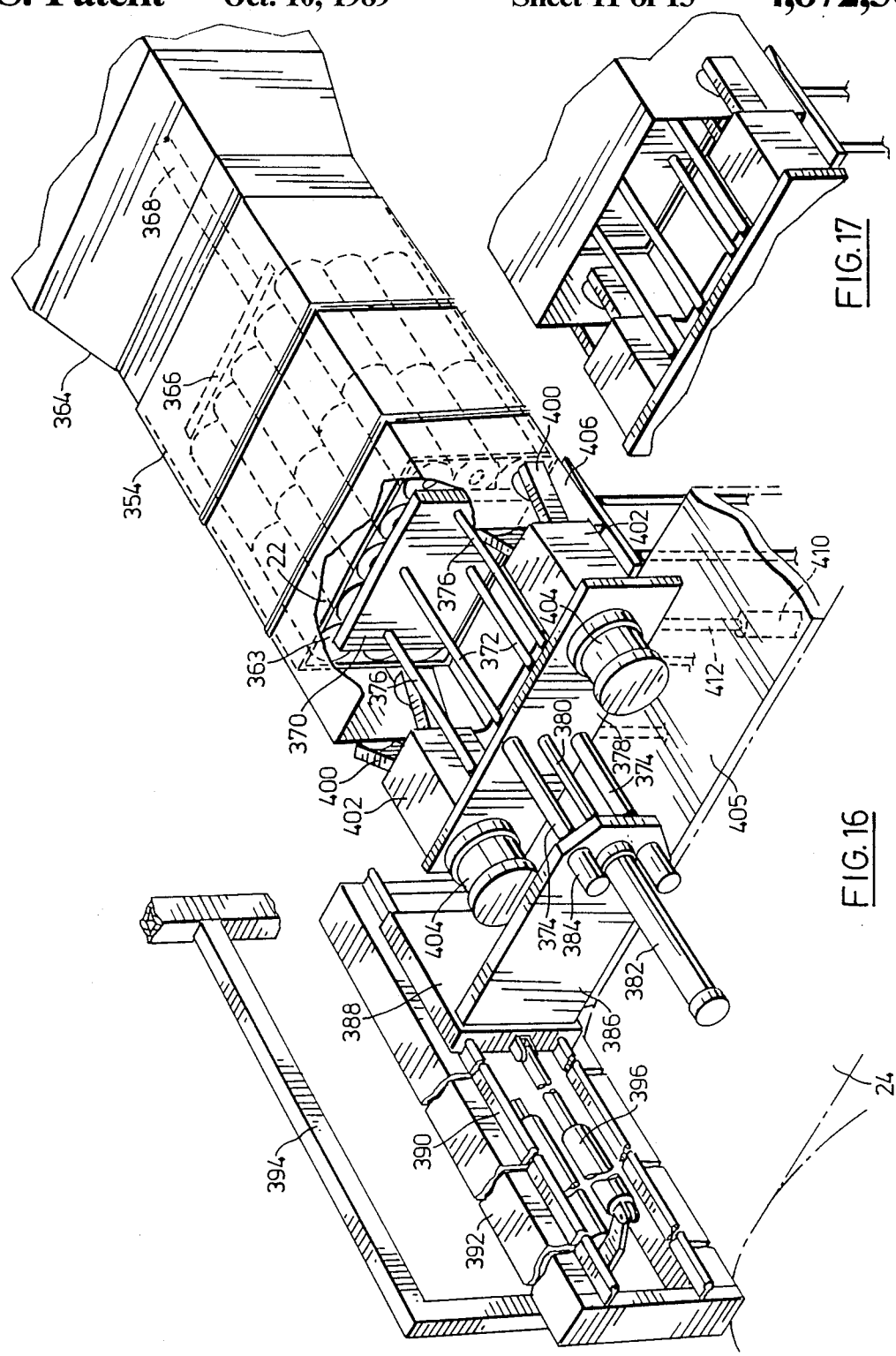

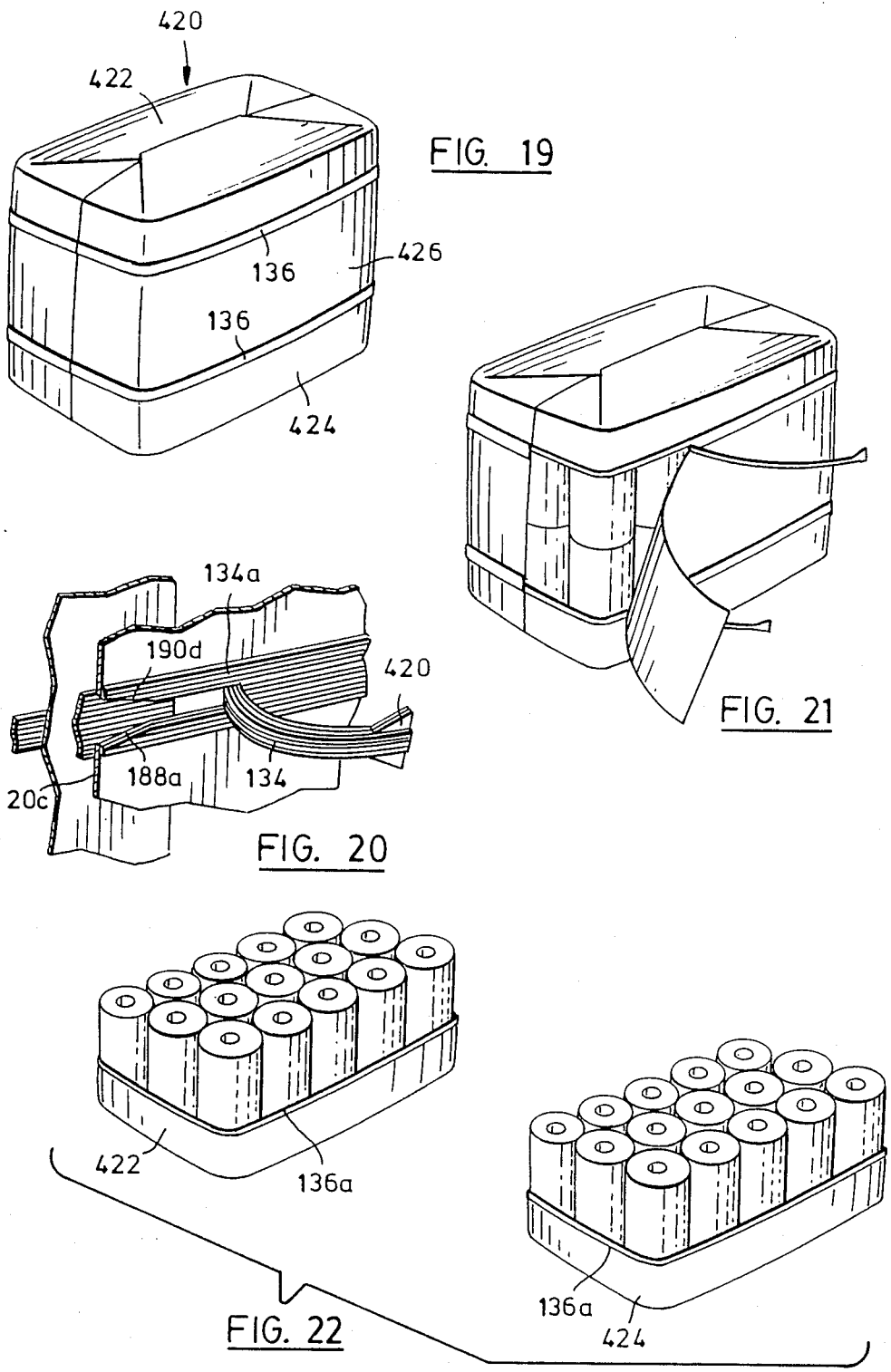

PACKAGING MACHINERY AND A METHOD OF MAKING A WRAP-AROUND SHIPPER PACKAGE

This invention relates to packaging machinery and a method of making a wrap-around shipper package.

PRIOR ART

Items such as paper towels and the like which are compressible are frequently packaged in cartons for shipment from the manufacturer to the retail outlet. These cartons are merely disposed of after they have served their purpose. Cartons are, however, expensive items and they add considerably to the distributing cost of the goods. Items such as paper towels and paper tissue are relatively inexpensive items, however, their cost can be greatly increased by the high cost of the cartons and the machinery required in order to load the cartons.

Cartons are generally manufactured in large numbers in a plant which is remote from the packaging plant where the items such as paper towels are packaged. Consequently, the manufacture, shipping and handling of the cartons which occurs prior to the loading of the cartons adds considerably to the distribution costs.

In U.S. Pat. No. 3,879,920 dated Apr. 25, 1975, a carton loading machine is described in which the load items are initially loaded into a bucket which forms a mandrel about which a carton blank is folded to form a sleeve and thereafter the sleeve and the load item are removed from the mandrel to provide a loaded package. Again, however, in this prior system carton blanks are preformed to the required blank configuration before the wrapping takes place.

In other wrapping devices, it has been common to use the load item as a mandrel about which a flexible wrapper is wound. This is not, however, practical when attempting to wrap a load which is formed from a plurality of load items and in particular where the load items are made from a flexible material.

In other packaging machinery where a plurality of load items are loaded into a preformed bag, it is known to use tapered horn for the purposes of assembling the load items into a predetermined array and pushing the prearranged load items through the horn to compress the load items when the horn is located so that it extends into the open mouth of a bag. Again, in this technique the bags are preformed and it is necessary to provide a mechanism for opening if a high speed loading operation is to be performed.

The present packaging machine is one which manufactures a shipper package which comprises a preassembled load and a flexible wrapper which is wrapped around the load.

The present package is manufactured in the packaging machine from a starting material which consists of a longitudinally elongated web of flexible wrapping material which is initially stored in the form of a coil or roll. Generally, the flexible wrapping material will be in the form of paper.

Difficulty has long been experienced in attempting to handle large coils or rolls of flexible material such as paper because of the very substantial weight of the material in the coil. These problems are particularly acute when attempting to design unwinding dispensers for unwinding a coil and feeding it into a machine in which a subsequent operation is to be carried out. When the diameter of the coil of material which is to be unwound is the same at the beginning of each unwinding operation, it is possible to provide a relatively simple jacking mechanism for raising the coil onto its unwinding support because the position of the hollow core of the coil in relation to the diameter of the coil will always be substantially the same. However, in applications where the diameter of the coil may vary considerably such as in a packaging machine where coils of different widths may be required when packaging load items of different size and where not all of the coil of the first width may be used at any one time with the result that it may be necessary to remount a coil in the machine in order to make an efficient use of the wrapping web. The partial coil may have a substantially smaller diameter than a complete coil and consequently, difficulty is experienced in attempting to align all of these coils of different diameter with an unwinding axis which is located at a predetermined fixed height. We have found that it is possible to overcome these difficulties and to provide a simple control system for an elevator platform wherein the position of the hollow core of the coil is detected as the coil is raised and after detection, the further elevation of the platform is limited to that required to move the hollow core from its detected position to the position in which it is aligned with the unwinding axis. It will be appreciated that the distance between the unwinding axis of the feeding station and the predetermined sensing position is not affected by the diameter of the roll and consequently, when the sensor detects the presence of the hollow core of the coil at the predetermined position, the system then knows the extent to which the elevator platform must be raised in order to obtain the required alignment.

In order to accurately position the coil on the support platform, a shallow alignment channel is formed on and extends transversely across the platform. The channel is shaped so that it will support a coil with the winding axis of the coil located directly below the unwinding axis of the web dispenser mechanism.

In order to facilitate the subsequent opening of the shipper package, tear tapes are applied to the outer and inner face of the web as the web is driven along the web feeding path which extends from the dispensing machine to the wrapping station. The tear tape which is applied to the inner face is a narrower tape than that which is applied to the outer face. The tear tape which is applied to the outer face is arranged directly above and centered on the tear tape which is applied to the lower face. The upper face of the web will form the inner face of the package and the lower face of the web will form the outer face of the package such that the narrow tape will be located on the inner face of the package and the wider tape will be located on the outer face of a package. In order to provide access to the narrow inner tape, notches are formed in opposite side edges of the wider tape which extend to opposite side edges of the narrower tape so that it is possible to reach through the notches to grasp the narrow tape and to pull it through the wider tape. By employing conventional binding tapes which are reinforced by longitudinally extending fibres, it is relatively easy to shear the wide tape in the direction of its longitudinal extent so that a central portion of the wider tape can be peeled away from marginal portions on either side thereof in the longitudinal direction of the tape by the shearing action of the side edges of the narrow tape.

Most packaging machinery must be designed to accommodate more than one package size and difficulty is frequently experienced in changing the set up of a packaging machine when changing from one package size to the other. This was a difficult problem to overcome in the design of the present machine. In the design of the present machine, it was thought that it would be desirable to wrap a length of web around a package in a manner approaching that used when manually wrapping a package. That is to say a length of flexible web would be wound from a coil and simply wound around the package. In this case, in order to hold all of the items together, the package would be in the form of a mandrel containing the load items. The problem, however, is that the proportions of this package would clearly vary and while it is a simple matter to accommodate these variations when manually wrapping a package merely by adjusting the length of the portion of the web which is unwound, it is not such a simple matter when designing a machine which can accommodate these variations and which is simple to adjust to accommodate these changes.

We have found that by using slueing it is possible to effectively wrap a web around the mandrel in the manner similar to a conventional manual technique. In order to produce packages of different sizes, it is merely necessary to replace the mandrel with a mandrel of the required proportions and to replace the slueing rings with slueing rings which are proportioned to correspond to the proportions of the mandrel. Clearly the peripheral length of the mandrel is related to the length of the web which is required for the purposes of wrapping the mandrel. We therefore accommodate these changes by changing the slueing rings to use slueing rings of a circumference which will serve to deploy a wrapping length of web which corresponds that required for wrapping around the selected mandrel. The slueing rings are mounted so as to be readily removable and replaceable and consequently, a minimum amount of downtime is required in order to make the appropriate adjustments.

It is an object of the present invention to provide a high speed packaging machine for wrapping a flexible web around and is simple to load.

It is a further object of the present invention to provide a packaging machine which has a wrapping mechanism which is operable to grasp a leading end of a first length of an elongated flexible web and to pull the web along a web wrapping path which extends around a wrapping mandrel to wrap the web around the mandrel.

According to one aspect of the present invention, there is provided in a packaging machine for wrapping a flexible web around an assembled load comprising wrapping station having an elongated web wrapping path extending therein along which a web is pulled from a web cutting station, web dispenser means for dispensing a longitudinally elongated flexible web, in the direction of its longitudinal extent, along a web feeding path which extends to the web cutting station, a wrapping mandrel mounted in said wrapping station, said mandrel having a wrapping support face which has a longitudinal extent which extends transversely of said web wrapping path and a peripheral extent which extends in the direction of the wrapping path, said wrapping path extending around said wrapping support face, said mandrel having a load transfer passage opening therethrough, said load transfer passage extending transversely of said web wrapping path and having a discharge end opening toward a first side of said wrapping path, wrapper means mounted in said wrapping station for movement along said wrapping path, said wrapper means being operable to grasp a leading end of a first length of an elongated flexible web and to pull said leading end along the web wrapping path to locate said first length of web in a position extending around said support face of said wrapping mandrel with a marginal edge portion of the web projecting from the discharge end of the mandrel, web cutting means in said wrapping station for cutting the first length of web along a trailing edge thereof to separate the first length from the remainder of the web after it has been wrapped around the mandrel, folding means in the wrapping station for folding the leading and trailing ends of the web into an overlapping position on the mandrel to form a sleeve around the mandrel, discharge means for simultaneously discharging an accumulated load through the discharge end of the wrapping mandrel and stripping the sleeve from the mandrel such that the accumulated load is discharged into the sleeve and is transported laterally out of the wrapping path to an end closure mechanism.

According to a further aspect of the present invention, there is provided a method of forming a shipper package which comprises a plurality of load items which are arranged in a side-by-side array and a wrapper which surrounds the array of load items, the wrapper being formed from a first length of an elongated web of flexible material, said first length having a leading end and a trailing end, comprising the steps of loading a plurality of load items into a load transfer passage of a wrapping mandrel to form a compressed assembled load therein, the load transfer passage having a discharge opening at one end thereof, the wrapping mandrel being located in a wrapping station and extending transversely thereof, locating a leading end of a first length of an elongated web of flexible material at the entrance to a wrapping station, said first length of elongated web also having a trailing end, grasping said leading end of said first length when it is located at said entrance and drawing the leading end of said first length around said mandrel along a wrapping path which is spaced from the mandrel to draw the leading length around the mandrel to substantially encircle the mandrel, severing the trailing end of said first length of web from the leading end of a subsequent length, folding the leading and trailing ends around the mandrel into an overlapping position and securing the leading and trailing ends of the first length to one another to form a sleeve, simultaneously discharging the assembled load through the discharge end of the mandrel and stripping the sleeve from the mandrel to allow the load to expand into contact with the sleeve such that the sleeve forms a wrapper which envelopes the assembled load items.

According to a still further aspect of the present invention, there is provided a dispenser mechanism for unwinding and dispensing a web of flexible material from a coil of said material which has a winding axis about which the coil is wound and a hollow core which is coaxial with the winding axis comprising a coil unwinding station from which a coil is unwound along a feeding path, coil support means in said unwinding station, said coil support means having an unwinding axis, said coil support means being capable of supporting a coil in an elevated position with the winding axis of the coil aligned with said unwinding axis for unwinding rotation thereon, unwinding belt means having a forward run portion arranged to bear against an arcuate portion of the perimeter of a coil which is mounted on said support means in use, belt support means supporting said unwinding belt for movement of the forward run portion toward and away from said unwinding axis, biasing means normally biasing the belt support means toward said unwinding axis to maintain driving contact between the forward run of the belt and the perimeter of the coil as the diameter of the coil progressively decreases in use, drive means for driving the unwinding belt.

According to yet another aspect of the present invention, there is provided in a wrapper which consists of a web of flexible material which is resistant to straight line tear propogation, said web having an inner face and an outer face and oppositely disposed first and second side edges, the improvement of;

(a) a first tear tape secured to the outer face of said web and extending between said first and second side edges of the web, (b) a second tear tape secured to the inner face of said web and extending between said first and second side edges of the web, said second tear tape underlying said first tear tape and being narrower than said first tear tape such that the side edges of the second tear tape are spaced inwardly from the side edges of the first tear tape, such that when the second tear tape is pulled to remove it, the wrapper and the first tear tape will tear along tear lines which follow of side edge of the second tape to provide a controlled tear propagation along the tear tapes between the side edges of the wrapper.

According to a still further aspect of the present invention, there is provided a shipper package which consists of an assembled load and a wrapper which is wrapped around the assembled load, said wrapper consisting of a web of flexible material which is resistant to straight line tear propagation, said web having an inner face disposed opposite the load and an outer face and oppositely disposed side edge which are arranged in an overlapping configuration to form a lap joint of the package, the improvement of a first tear tape secured to the outer face of said web and extending between said first and second side edges of the web, a second tear tape secured to the inner face of said web and extending between said first and second side edges of the web, said second tear tape underlying said first tear tape and being narrower than said first tear tape such that the side edges of the second tear tape are spaced inwardly from the side edges of the first tear tape, such that when the second tear tape is pulled to remove it, the wrapper and the first tape will tear along tear lines which follow of side edge of the second tape to provide a controlled tear propagation along the tear tapes between the side edges of the wrapper.

Figure 2:
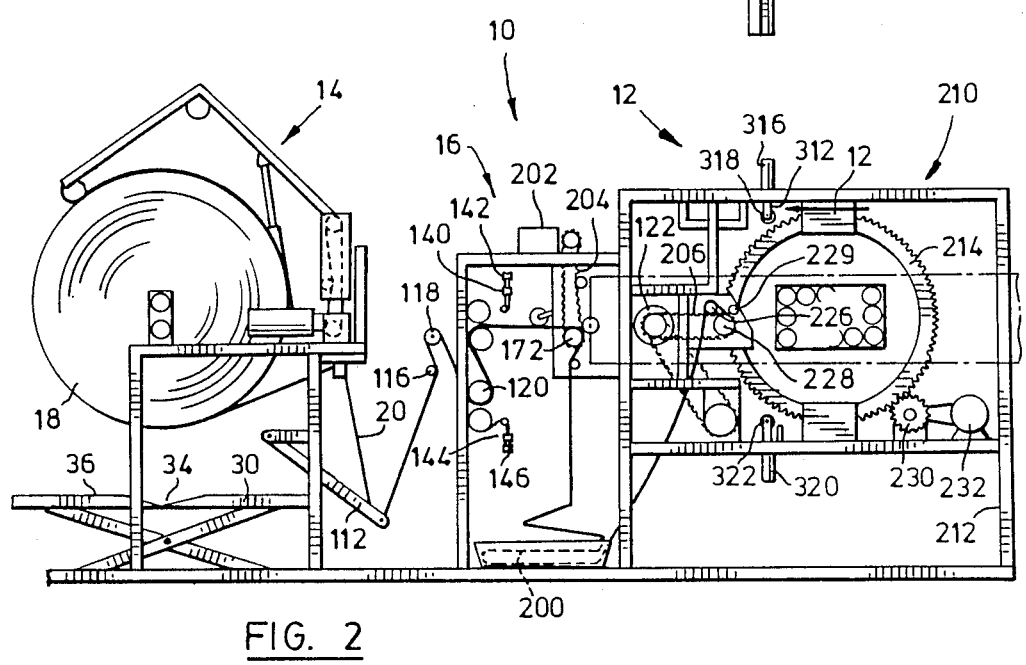
Figure 3:
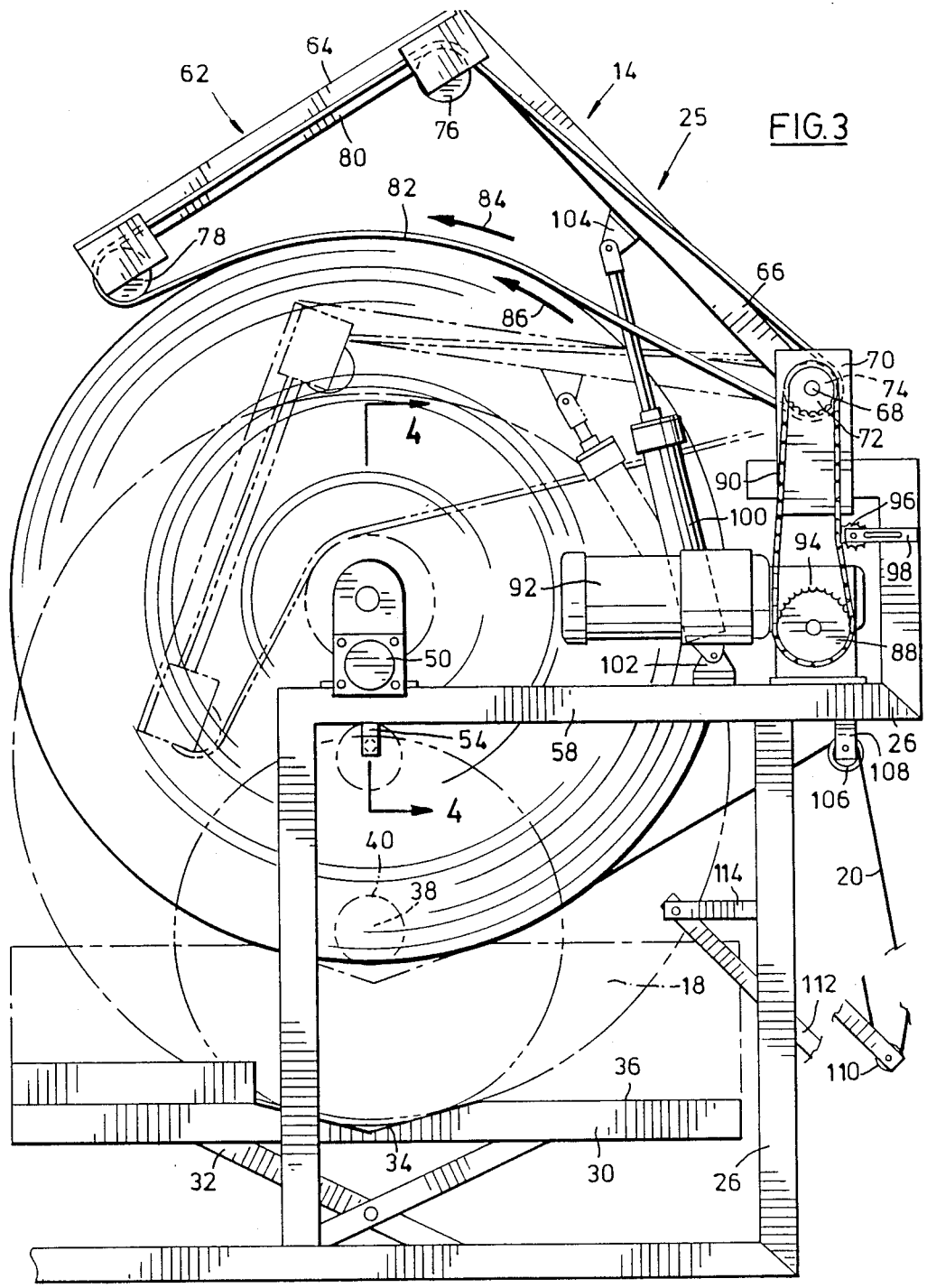
Figure 4:
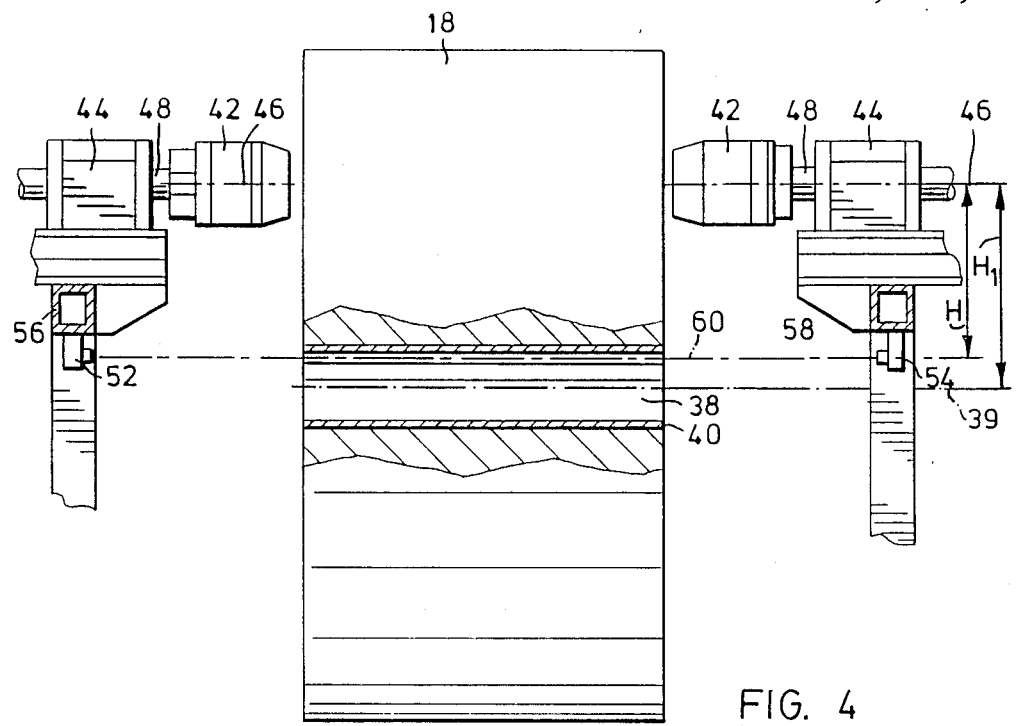
Figure 5:
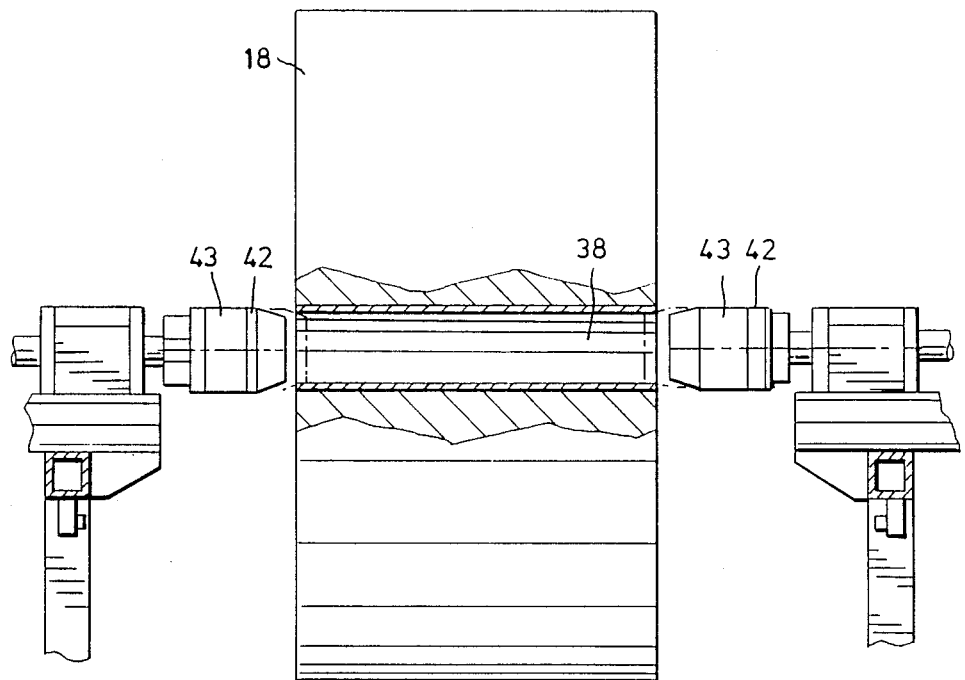
Figure 10:
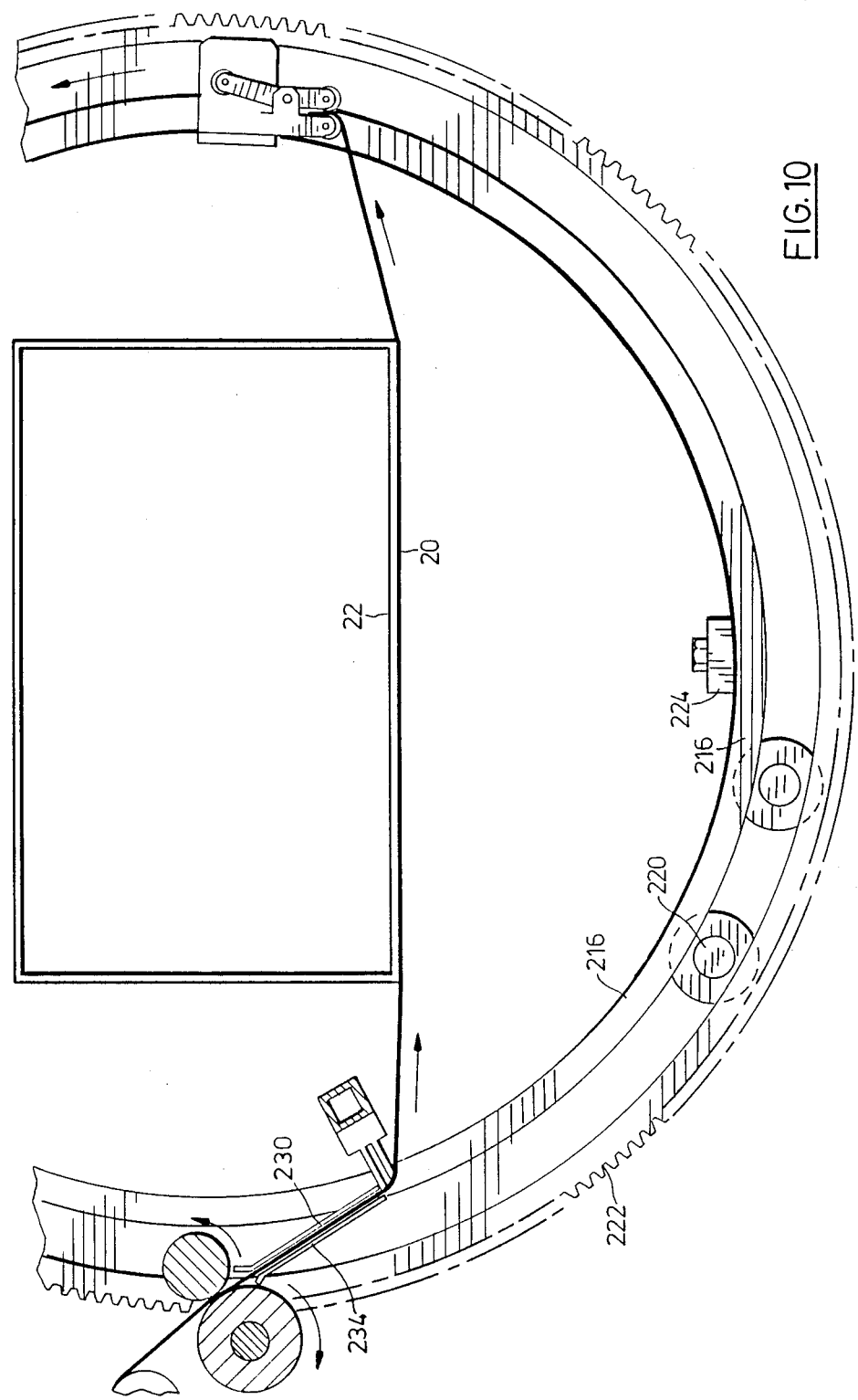
Figure 11:
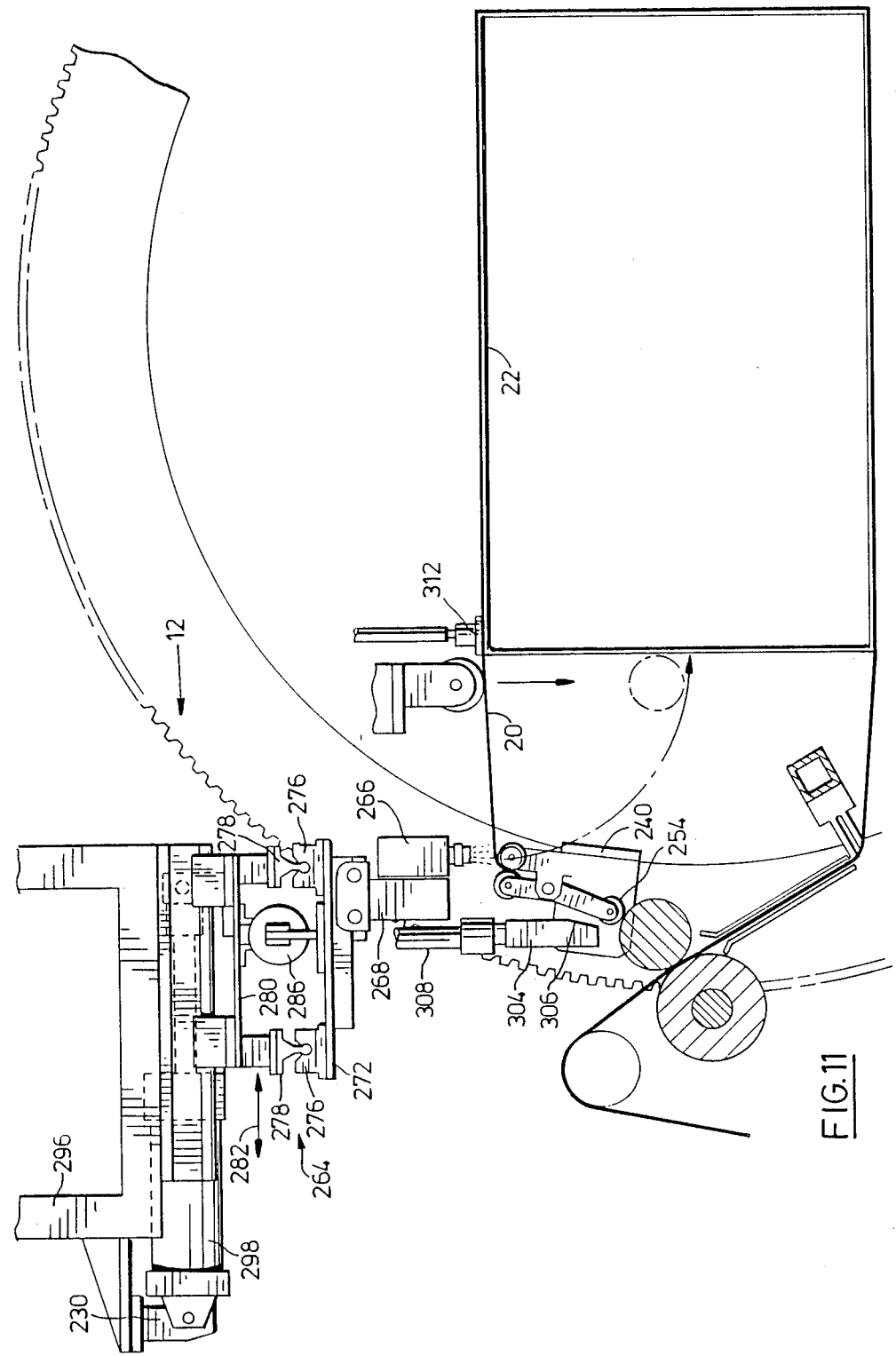
Figure 12:
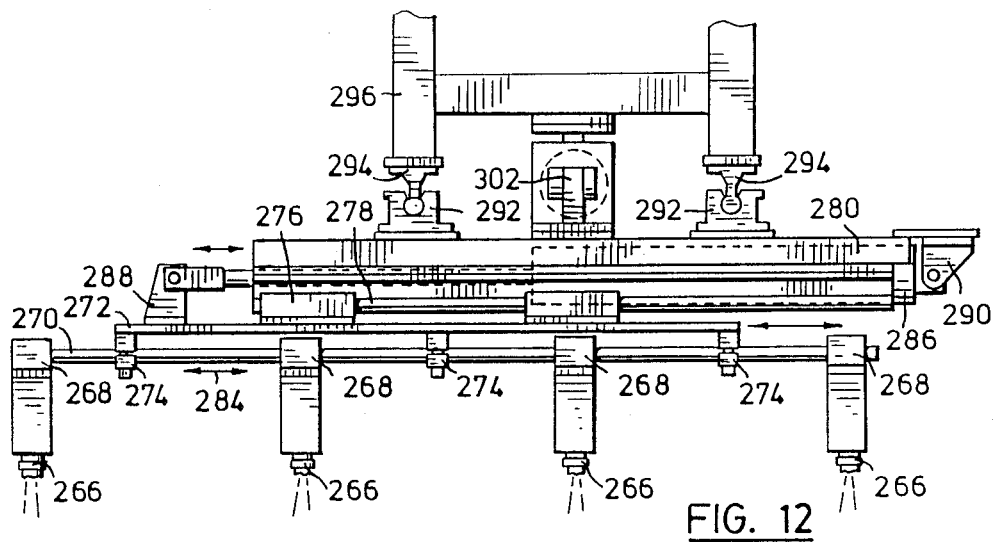
Figure 13:
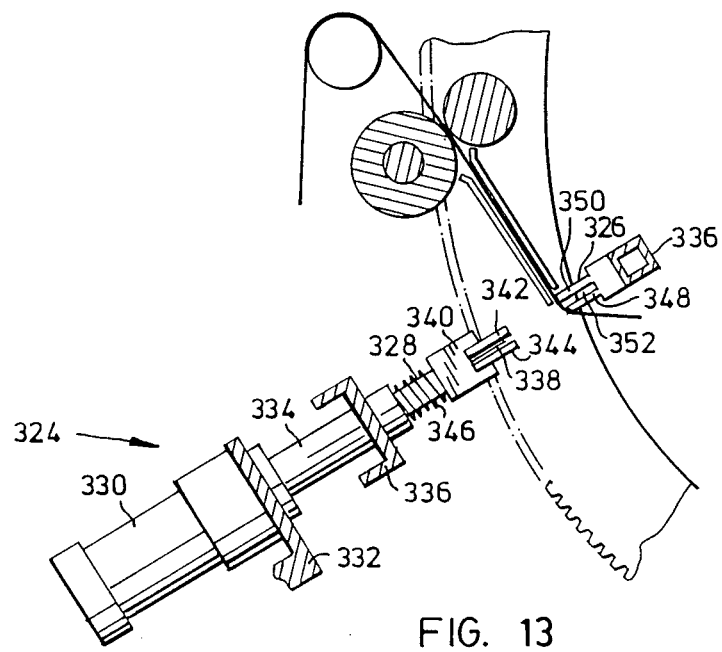
Figure 18:
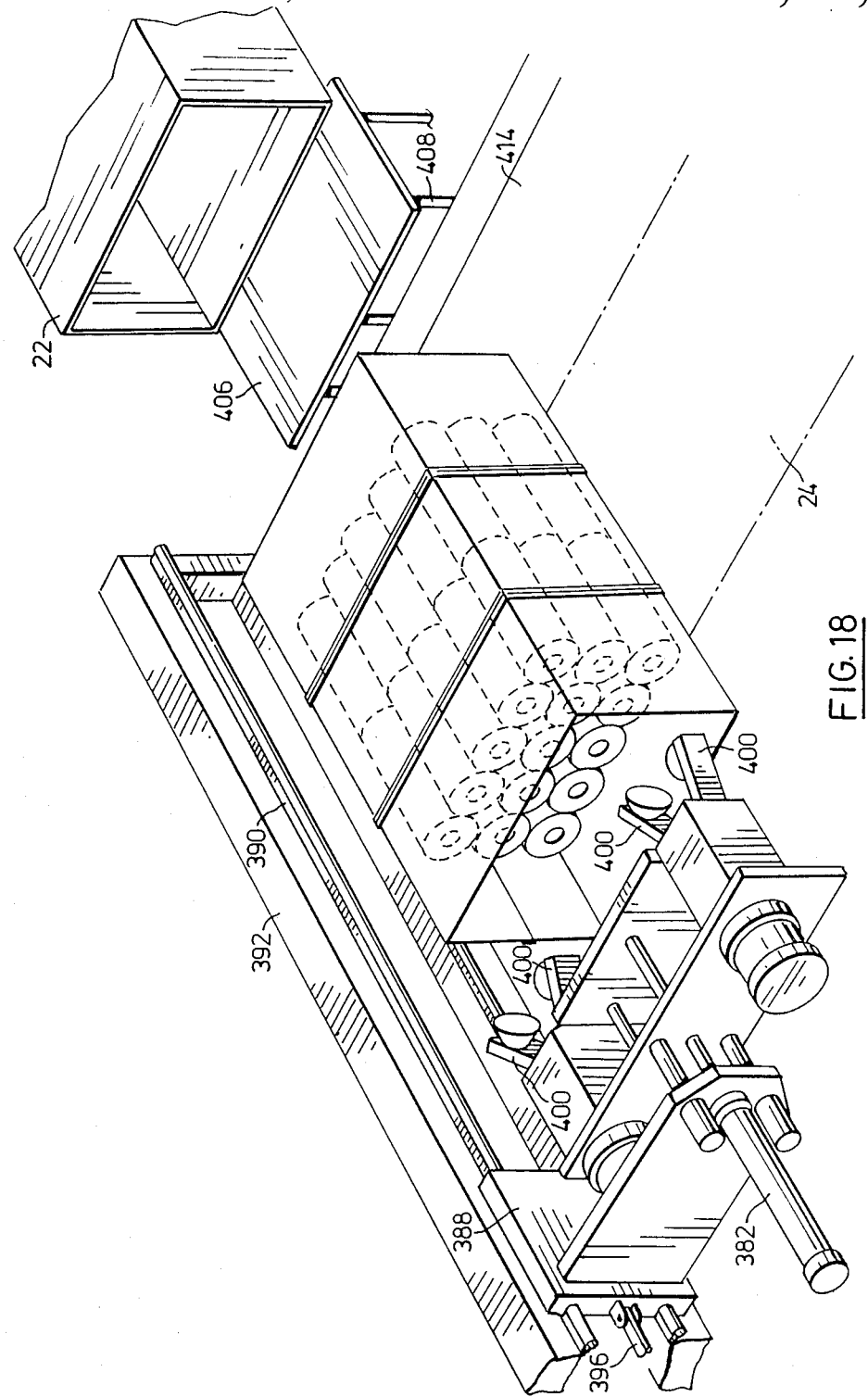

The invention will be more clearly understood after reference to the following detailed specification read in conjunction with the drawings wherein:

FIG. 1 is a plan view of a wrap-around packaging machine constructed in accordance with an embodiment of the present invention, FIG. 2 is a side view of the mechanism of FIG. 1 with the tape dispenser support mechanism removed to more clearly illustrate the feeding path followed by the unwinding web, FIG. 3 is a side view of the dispenser mechanism for unwinding and dispensing the web of flexible material from which the wrapper is formed taken in the direction of the arrow 3 of FIG. 1, FIG. 4 is a sectional side view taken along the line 4—4 of FIG. 3, FIG. 5 is a view similar to FIG. 4 showing the alignment of the core of the coils of the unwinding axis of the dispenser mechanism, FIG. 6 is a partially sectioned pictorial view of the tear tape application station in the direction of the arrow 6 of FIG. 1, which illustrates the manner in which tear tape is applied to the upper and lower surfaces of the web, FIG. 7 is a pictorial view in the direction of the arrow 7 of FIG. 1, which illustrates the notching mechanism which is used to form notches on opposite sides of the tear tape to facilitate the access to the narrow tear tape for the removal of the tear tape, FIG. 8 is a sectional view taken along the line 8—8 of FIG. 7, FIG. 9 is an end view of a mandrel in the direction of the arrow 9 of FIG. 1, showing the gripper mechanism which is carried by the slueing rings located at the starting point of the wrapping operation immediately prior to the gripping of the leading end of the web which is to be wrapped around the mandrel, FIG. 10 is a view similar to FIG. 9, showing a second position of the gripper mechanism, FIG. 11 is a view similar to FIG. 10, showing the final position of the gripper mechanism and also illustrating the glue dispenser mechanism used for applying an adhesive to the web immediately prior to the release of the leading end of the web, FIG. 12 is a front view of the glue dispenser mechanism in the direction of the arrow 12 of FIGS. 2 and 11, FIG. 13 is a side view of the cutter mechanism used to cut the first length of web from the subsequent length of web, FIG. 14 is an end view similar to FIG. 11 showing the manner in which the gripper mechanism is released and the leading end is wrapped around the mandrel, FIG. 15 is a view similar to FIG. 14 showing the manner in which the trailing end of the web is cut and folded around the mandrel into an overlapping position with respect to the leading end, FIG. 16 is a pictorial view illustrating the discharge mechanism used for simultaneously discharging the accumulated load and for stripping the sleeve from the mandrel, FIG. 17 is a view of a portion of the mechanism of FIG. 16 showing the gripper members of the stripper mechanism in a position in which they grip the end of the wrapper, FIG. 18 is a view similar to FIG. 16 showing the relative positions of the load items and the wrapping sleeve after removal from the mandrel and their positioning on a conveyor for transportation to a mechanism for closing the ends of the wrapper and carton, FIG. 19 is a pictorial view of a shipper package constructed in accordance with an embodiment of the present invention, FIG. 20 is an enlarged detail view of one of the tear strips of the package of FIG. 17, FIG. 21 is a view similar to FIG. 17 showing the manner in which the package is opened, FIG. 22 is a view showing the two halves of the shipper package which remain after the removal of the centre panel, each half supporting half of the load in an easily accessible display array.

With reference to FIG. 1 of the drawings, the reference numeral 10 refers generally to a packaging machine constructed in accordance with an embodiment of the present invention. The reference numeral 11 refers generally to a wrapping station in which a flexible web is wrapped around an assembled load and the reference numeral 15 refers generally to a web dispenser station in which a web is unwound from a coil. The reference numeral 16 refers generally to a tear tape applying station in which a tear tape is applied to the web.

As shown in FIGS. 1 and 2 of the drawings, a coil 18 is mounted for unwinding rotation about its unwinding axis and a web 20 is unwound from the coil along an unwinding path which leads from the web dispenser station 15 through the tape applying station 16 to the wrapping station 11. In the wrapping station 11, the web is wrapped around a mandrel 22 to form a sleeve. The sleeve and the contents of the mandrel are then removed laterally and transferred to a conveyor 24 for subsequent closing of the ends of the sleeve.

WEB DISPENSER MECHANISM

The web dispenser mechanism 24 will now be described with reference to FIGS. 1 to 5 of the drawings. As shown particularly in FIG. 3 of the drawings, the web dispenser mechanism 24, which is located in the web dispenser station 14 includes a frame 26.

A rectangular-shaped platform 30 is mounted on the frame 26 and is supported for elevation with respect to the frame 26 by means of a scissors mechanism 32. The scissors mechanism 32 is drivingly connected to a jacking mechanism in the form of a motor which has an output shaft drivingly connected to an acme screw shaft which is in turn threaded in a nut which is secured to one end of one of the arms of the scissor mechanism such that when the motor is driven in one direction the acme screw will be rotatably driven so as to close the scissors lever mechanism to elevate the platform 30. This type of scissors elevating mechanism is well known and is not illustrated in detail so as to permit the drawings to illustrate the manner in which the mechanism functions.

The upper surface 36 of the platform 30 is formed with a V-shaped notch 34 which extends transversely thereof. This V-shaped notch serves to centre the coil 18 on the platform with the bore 38 of the core 40 of the coil 18 vertically aligned with the center of the notch.

As shown in FIGS. 4 and 5 of the drawings, a pair of chucks 42 are mounted at opposite sides of the dispenser station with their shafts 48 mounted for rotation in bearings 44 about the unwinding axis 46. The chuck assemblies are each mounted for movement toward and away from each other by means of pneumatic cylinder 50 (FIG. 3)

Sensors 52 and 54 are mounted on the horizontal beams 56 and 58 of the frame 26 with their sensing axis 60 spaced a predetermined fixed height H from the axis 46 of the chucks.

In use the coil 18 is mounted on the platform 36 and is centered with the axis of the bore 38 vertically aligned with the sensing axis 60 and the unwinding axis 46. The platform is then elevated to raise the coil to align the bore 38 with the chucks 42. As the coil is elevated, the bore 38 will eventually become aligned with the sensing axis 60. The sensors 52,54 will then respond by generating a signal which is detected by the control system so as to interrupt the supply of power to the motor which drives the scissors mechanism after a predetermined number of rotations of the ACME screw shaft following the activation of the sensor mechanism. The predetermined number of activations of the ACME screw shaft being sufficient to raise the platform by the height H1 which is the distance between the axis 39 of the bore 38 and the axis 46 thereby to align the axis 39 and the axis 46. Thereafter, the rams 50 are activated to cause the chucks 42 to move inwardly toward one another to be seated in the bore 38 as shown in broken lines. Thereafter, the platform 30 may be lowered so that the coil 18 is free to rotate about the unwinding axis 46.

UNWINDING DRIVE MECHANISM

The unwinding drive mechanism is generally identified by the reference numeral 62 (FIG. 3). The unwinding drive mechanism 62 is used for the purposes of rotatably driving the coil 18. This mechanism includes an L-shaped arm 64, the proximal end 66 of which is mounted for pivotal movement on a support shaft 68. The shaft 68 is mounted on brackets 70 which are located at opposite sides of the frame. A sprocket 72 is mounted on the shaft 68 and is drivingly connected to a driven pulley 74 which is also mounted for rotation on the shaft 68. Idler pulleys 76 and 78 are mounted at the elbow and the distal end respectively of the L-shaped arm 64. An endless drive belt 80 is mounted on the pulleys 74, 76 and 78 for movement therealong. The portion 82 of the driven belt 80 which extends between the pulleys 74 and 78 bears against the outer periphery of the coil 18 as shown in FIG. 3 and when it is driven in the direction of the arrow 84, it will in turn drive the coil 18 in the direction of the arrow 86 which is the unwinding direction which is required in order to unwind the web 20 from the coil 18.

The sprocket 72 is drivingly connected to the output sprocket 88 by means of chain 90. The sprocket 88 is mounted on the power output shaft of a gearbox 94 which is driven by an electric motor 92. By activating the electric motor 92, the belt 80 is therefore driven in the direction of the arrow 84 to unwind the coil. A tensioning sprocket 96 is mounted on a slide 98 which is carried by the frame so as to maintain tension in the chain 94 in a conventional manner.

For the purposes of moving the L-shaped arm 64 about the shaft 68, an extensible air cylinder 100 is provided. One end of the ram 100 is pivotally mounted on a bracket 102 which is secured to the horizontal frame member 56 while the other end is mounted on a bracket 104 which is secured to the arm 64 at a point spaced radially from the shaft 68. The cylinder 100 is extended it will serve to raise the unwinding drive mechanism 62 and when it is contracted, it will serve to pull the unwinding drive mechanism downwardly toward the coil 18 which is being unwound. It will be understood that the extensible ram 100 is normally urged toward the retracted position at all times when the unwinding drive mechanism is in operation so as to maintain contact between the portion 82 and the unwinding coil regardless of the diameter of the unwinding coil. It will therefore be seen that the ability of the unwinding drive mechanism of the present invention to effectively unwind a coil is not hindered by the reduction in diameter of the coil and it is capable of unwinding coils having substantially different diameters.

As previously indicated, the chucks 42 are mounted for movement toward and away from one another for the purposes of mounting and removing a coil therefrom. It will also be apparent that this same movement will permit this mechanism to support coils of different widths.

As shown in FIG. 3 of the drawings, the unwinding web 20 is threaded around a guide roller 106 which is supported by brackets 108 which depend from the frame 26. The unwinding web 20 is also extended around a roller 110 which is mounted on and extends transversely between a pair of lever arms 112. The proximal end of each lever arm 112 is mounted for pivotal movement on a bracket 114 which is secured to the frame 26. The roller 110 acts as a "dancer roll" which serves to maintain tension in the unwinding web 20. The unwinding web 20 continues its travel along the unwinding path and passes around rollers 116 and 118 (FIG. 1 and 2) which are mounted on and extend transversely of the frame 26. The web 20 then enters the tear tape applying station 16 wherein it is guided around rollers 120 and 122.

TEAR TAPE DISPENSER MECHANISM

As shown in FIG. 1 of the drawings, a tape dispenser support frame 124 is positioned laterally outwardly from the tear tape applying station. As will be described hereinafter, four tear tapes are applied to the web in the tear tape applying station. In the plan view illustrated in FIG. 1 of the drawings, two tear tape spools 126 and 128 are shown and are mounted for rotation on shafts 130 and 132. The spools 126 and 128 each carry a narrow tape 134 which is to be applied to the upper surface of the web. Similar spools (not shown) underly the spools 126 and 128 and carry a wide tape 136. The tapes 134 are guided across the unwinding path of the web by a first set of guide pulleys 138 to second sets 140 and 142. Each of the second sets 140 and 142 are multiple guide pulleys arranged to reverse the direction of the tape from the transverse direction to a vertical direction. The same type of pulley arrangement which is used to alter the direction of a belt is employed and is not shown in detail because it is a well-known structure. Similar sets of direction reversing guide rollers 144 and 146 are provided for guiding and changing the direction of movement of wide tapes 136.

As shown in FIG. 6 of the drawings, the narrow tapes 134 are guided around pulleys 148 onto hot rollers 52 and 154. The hot rollers 152 and 154 are mounted for rotation on shafts 156 which are supported at the distal end of link arms 158, the proximal ends of the link arms 158 are pivotally mounted on a support shaft 160.

The wide tape 136 similarly extends around guide pulleys 162 and hot rollers 164 and 166 which are mounted on link arms 168 and 170 which support the rollers 164 and 166 in a position bearing against the guide roller 120. The rollers 164 and 166 heat the tape 136 to a sufficient extent to cause the hot melt empregnated heat sensitive tape to be bonded to the lower face 20a of the web. Similarly, the hot rollers 152 and 154 heat the heat sensitive narrow tapes 134 and serve to bond these tapes to the upper face 20b of the web by pressing the tape between the rollers 152, 154 and the roller 122. As shown in FIG. 6 of the drawings, the narrow tape 134 is applied so that it is positioned centrally of the width of the wide tape.

The web 20 extends within the tape applying station 16 from the roller 122 to a further roller 172 and then around a still further roller 174 which serves to drape it around the roller 172.

A notching mechanism is illustrated in FIG. 7 and 8 of the drawings and is generally identified by the reference numeral 176. The notching mechanism 176 comprises a pair of guide rods 178 which extend vertically downwardly from a beam 180 and terminate at an end plate 182 which extends transversely between the lower ends of the guide rods 178. A slide plate 184 has slidably mounted on the guide rods 178. An extensible ram 184 has one end secured to the beam 180 and its other end secured to the slide plate 184. Cutter blades 188 and 190 are mounted at the lower end of legs 192 which extend downwardly from opposite ends of the slide plate 84. The cutter blades 188 and 190 are arranged such that their cutting edges converge in the direction of movement of the web 20. A crossbar 194 extends transversely below the cutter blades 188 and 190 and serves to act as an anvil against which the cutter blades may bear in order to sever the web and side edge portions of the wide tape 136 as shown in FIG. 8 of the drawings. The cutter blades 188 and 190 serve to form the side edges of the V-shaped tab of the tear strip which is illustrated in FIG. 20 of the drawings.

A web measuring disc 196 is mounted on an arm 198 so that it bears against the web 20 and serves to cooperate with an optical monitoring device to monitor the length of web which is discharged from the tape applying station 16 into the web loop storage receptacle 200 (FIG. 2).

A sufficient length of web 20 is accumulated in the receptacle 200 to ensure that the loop will not be fully taken up during any one cycle of the wrapping mechanism.

A drive motor 202 (FIG. 2) is provided for driving the roller 172. A chain 204 connects the output from the drive motor 202 to the shaft 172. This drive mechanism serves to drive the web through the tape applying station 16.

WRAPPING MECHANISM

The wrapping mechanism which is generally identified by the reference numeral 210 includes a frame which is generally identified by the reference numeral 212. A pair of slueing rings 214 (FIGS. 1 and 2) are located one at each side of the wrapping station. Slueing rings of this type are known and are commonly used for the purposes of rotating the gun turret of a tank or the like. Each slueing ring comprises an inner ring member 216 and an outer ring member 218 and a roller bearing assembly 220 which is located therebetween. The outer ring 218 is formed with gear teeth 222 which are used for the purposes of rotatably driving the outer ring 218 with respect to the inner ring 216. As shown in Fig. 10 of the drawings, a plate 224 is welded or otherwise secured to the inner ring 216. This plate 224 and a similar located at 180° from that illustrated in FIG. 10 are each secured to the frame 214 and serve to anchor and retain the stationary ring in a stationary position with respect to the frame 214. The gear teeth 222 of the outer ring 218 mesh with a gear wheel 230 (FIG. 2) which is mounted on the output shaft of a gear box which is driven by a motor 232. When the motor 232 is activated, the outer ring 218 may be rotatably driven in either direction.

Referring once again to FIG. 9 of the drawings, it will be seen that the leading end portion of the web 20 passes around a roller 226 at the entry to the wrapping station and it then passes through the nip which is formed between the rollers 228 and 230. The roller 228 is normally urged toward the roller 229 to maintain a tight nip therebetween which will serve to retain the web 20 therebetween. The leading end of the web 20 then passes between a pair of oppositely disposed guide plates 234 and 236. The guide plates 234 and 236 extend in a face-to-face relationship and form a guide passage therebetween which extends along the web feeding path and serve to guide the web into the web cutting station 238.

As shown in FIG. 9 of the drawings, the outer ring 218 has a gripper assembly 240 mounted thereon. Each gripper assembly 240 includes a mounting bracket 242 which is mounted on the outer ring 216. A fixed jaw 244 is mounted on the mounting bracket 242. A moving jaw 246 is pivotally mounted on the fixed jaw 244. Grippers 248 and 250 are mounted at the outer ends of the jaws 244 and 246 respectively and serve to form a gripping nip therebetween in use. The moving jaw 246 has an extension 252 which extends from the opposite sides of the pivotal connection which is formed between the moving jaw and the fixed jaw. A roller 254 is mounted at the outer end of the extension 252.

It will be noted that when the gripper assembly 240 is located at the starting point shown in FIG. 9 of the drawings, the jaw 246 is located in an open position by reason of the fact that the roller 254 of the extension is displaced by means of a ramp face 256 of a wedge 258 which is mounted on a shaft 260 of a pneumatic ram 262. When the shaft 260 of the ram 262 is located in the extended position shown in FIG. 9, the ramp face 256 of the wedge 258 bears against the roller 254 and serves to locate the jaw 246 in the open position shown in FIG. 9. In order to clamp the leading end of the web between the rollers 248 and 250, the ram 262 is activated to lower the wedge 258 to permit the extension 252 to move to the position shown in broken lines in FIG. 9 under the influence of a strong return spring (not shown) and this in turn causes the roller 250 to bear against the roller 248 to clamp the leading end of the web 20 between the rollers 250 and 248.

In the embodiment illustrated in FIG. 9 of the drawings, the mandrel 22 is positioned so that the centre of its cross-section is aligned with the centre of rotation 264 of the slueing rings.

In use, when the motor 232 is activated to drive the outer slueing ring 218, the gripper assembly 240 will be driven around the slueing ring from the starting position shown in FIG. 9 through the intermediate relation shown in FIG. 10 to the terminal position shown in FIG. 11. As shown in FIG. 10, it is only after a substantial portion of the web 20 has been withdrawn from the guides 234, 236 that it makes contact with the mandrel 22. When the gripper assembly 240 is located in the terminal position shown in FIG. 11 of the drawings, an adhesive applicator which is generally identified by the reference numeral 264 is used for the purposes of applying adhesive to the outer face of the leading end portion of the web 20 before it is released by the clamping jaws. The adhesive applicator includes a plurality of nozzles 266, each of which is mounted on a bracket 268. The brackets 268 are mounted on a pair of support shafts 270. The support shafts 270 are clamped to a traverse carriage 272 by means of clamps 274. The traverse carriage 272 has bearing shoes 276 mounted thereon which slidably engage traverse guide rails 278 (FIG. 22). The traverse guide rails 278 are in turn mounted on a second carriage 280 which is mounted for movement into and out of the glue applicator station in the direction of the arrows 282. The traverse carriage 272 is driven to and fro in the direction of the arrows 284 (FIG. 12) by means of an extensible ram 286, one of which is fixed to a bracket 288 which is mounted on the traverse carriage 272 and the other end of which is mounted on the bracket 290 which is mounted on the second carriage 280. When the ram 286 is activated, it will serve to drive the nozzles 262 back and forth in the direction of the arrows 284 to apply a band of adhesive along the marginal edge portion of the leading end of the web 20 as shown in FIG. 11. The second carriage 280 has bearing shoes 292 mounted thereon which slidably engage the guide rails 294 which are mounted on the frame members 296. An extensible ram 298 has one end secured to a bracket 300 which is mounted on the frame members 296 and its other end is secured to a bracket 302 which is mounted on the second carriage 280. It will be apparent that when the nozzles 266 are in the position shown in FIG. 11, wherein they can serve to apply an adhesive to the web 20, they lie in the wrapping path and unless they are withdrawn during the wrapping operation, they would obstruct the wrapping path. The ram 298 serves to withdraw the nozzles from the wrapping path by moving the second carriage 282 to the left of the position shown in FIG. 11.

After the adhesive has been applied, it is necessary to release the leading end of the web 20 from the clamping jaws. This is achieved by means of a blade 304 which has an inclined ramp face 306 arranged to bear against the roller 254. The blade 304 is mounted on a shaft 308 of an extensible ram 310 (FIG. 14) for movement between the retracted position shown in FIG. 11 and the extended position shown in FIG. 14 to open the jaws to release the leading end of the web 20.

Before the jaws of the gripper member are released, the web 20 will assume a position in which it is extended in a taut condition around the mandrel 22 as shown in FIGS. 11 of the drawings. In order to maintain this taut configuration after the jaws of the gripper release the leading end of the web 20, the folding mechanism includes pressure pads 312 which will bear against the mandrel 22 to clamp the web 20 therebetween at a point adjacent the folding edge. The pads 312 are carried by the folding mechanism which is driven by an extensible ram 316 (FIG. 2) which also carries the folding rollers 318. Similar pads 314 are mounted on a ram 320 of a second folding mechanism which also carries folding rollers 322 (FIG. 2) As shown in FIG. 14, the pads 314 are arranged to bear against the mandrel 22 adjacent the second folding edge. The rams 316 and 320 serve to move the pads 312, 314 and folding rollers 318 and 322 into and out of the wrapping path so that when they are in the retracted position, the wrapping path is unobstructed.

After the pad 312 is arranged to bear against the mandrel 22 to clamp the web 20 therebetween as shown in FIG. 14. The ram 310 is activated to move the gripping jaws to the release position shown in FIG. 14 to release the leading end portion 20a of the web therefrom and the movement of the folding roller 318 serves to fold the leading end portion 20a of the web around the folding edge 22a to a position shown in FIG. 14.

A web cutting assembly 324 (FIG. 13) comprises an extensible air cylinder 330 which is mounted on the main frame member 332. The rams 330 each have an extensible shaft 328 which is slidably mounted in a support sleeve 334 which extends from the frame member 332 to a second frame member 336. A cutter blade 338 is mounted at the outer end of the shaft 328. A sheath 340 is slidably mounted on the shaft 328 and is normally located in an extended position in which the blade 338 is located between the sheath plates 342 and 344. A spring 346 serves to urge the sheath 340 to this position.

A backing member 326 is mounted on the main frame member 336 and has a pair of jaws 348 and 350 which are disposed opposite one another and form shearing slot 352 therebetween. In use, when the ram 330 is activated, the shaft 328 will be extended from the position shown in FIG. 13 toward the position shown in FIG. 15. As a result, the sheath 340 will be driven toward the backing member 326 until the web 20 is clamped between the sheath plates 342, 344 and the jaws 348 and 350. Thereafter, the knife 328 will continue to move toward the slot 352 and will cut the web 20 and then pass into the slot 352 as shown in FIG. 15 of the drawings. After the leading length of web has been cut from the remainder of the web, the second folding rod 332 will be driven to the position shown in FIG. 15 to fold the trailing end portion 20b of the web into an overlapping position with respect to the leading end portion 20a so that the adhesive coating previously applied to the leading end portion 20 will serve to secure the trailing end portion 20b to the leading end portion 20a to form a sleeve 354 around the mandrel 22 as shown in FIG. 16 of the drawings.

The mandrel 22 has a load accumulating compartment 360 formed therein (FIG. 9) in which a plurality of load items such as paper towels 362 accumulated. As shown in FIG. 16 of the drawings, the mandrel 22 is located at the outer end of a tapered horn 364. The horn 364 is a component of a load accumulator of a known type. A load accumulator suitable for accumulating a plurality of load items such as paper towels into a prearranged array and for driving these towels through the load horn into the mandrel is manufactured by Edson Packaging Machinery Limited of Hamilton, Ontario, Canada, and is generally known as an Edson accumulator/loader and will not therefore be described in detail. The loader has a pusher plate 366 which is mounted on the end of an arm 368 of a ram. The pusher plate 366 is proportioned to fit in a close fitting sliding relationship within the load accumulating compartment 356 of the sleeve and is moveable toward the discharge end of the sleeve to discharge the accumulated load from the load accumulating compartment 356.

A front stop plate 370 is normally positioned at the discharge end of the mandrel 22 to limit the movement of the accumulated load so that it does not extend beyond the discharge end of the mandrel during the wrapping operation. The front stop plate 370 is mounted on the outer end of a pair of shafts 372 which are the extendible shafts of extensible rams 374. Stabilizing guide rode 376 are also mounted on plate 370. The rams 374 are mounted on a bridge plate 378 for movement therewith. The bridge plate 378 is mounted on the outer end of a shaft 380 which extends from a ram 382. The rams 374 are slidably mounted in passages 384 which are formed in the support plate 386 which supports the ram 382. The support plate 386 is mounted on a carriage 388. The carriage 388 is slidably mounted on the guide rails 390 of a support frame 392 which is in turn mounted on the main frame members 394. An extensible ram 396 has one end connected to the carriage 388 and its other end connected to the frame 392. When the ram 396 is extended, the carriage 388 will assume the position shown in FIG. 16. When the ram 396 is contracted, the carriage 388 will move to the left of the position shown in FIG. 18 until it arrives at the position shown in FIG. 18.

For the purpose of stripping the sleeve 354 from the mandrel 22 as the load is discharged, two pair of gripping jaws 400 are mounted on support 402, each of which is in turn mounted on the bridge plate 378. Extensible ram assemblies 404 communicate with the jaws 400 and are operable to move the jaws 400 between the open position shown in FIG. 16 and the closed position shown in FIG. 16a so as to grip oppositely disposed portions of the sleeve which project beyond the end of the mandrel 22. These are the portions of the sleeve which will eventually be folded inwardly to close the end of the package as will be described hereinafter.

In use, the rams 374 serve to withdraw the front stop plate 370 from the end of the sleeve to assume the position shown in FIG. 18.

In order to support the accumulated load and sleeve as it is removed from the mandrel 22, a platform 406 is provided. The platform 406 is mounted on guide rods 408 which are slidably mounted on the main frame (not shown) and serve to maintain the platform 406 in the horizontal plane. An extensible ram 410 (FIG. 16) is mounted on the main frame and has a shaft 412 projecting therefrom. The shaft 412 is connected to the platform 406. The ram 410 is operable to extend and retract the shaft 412 to raise and lower the platform 406 as required in use. When the platform 406 is in the elevated position, it is arranged so as to be substantially coplanar with the conveyor 24 and is arranged in an edge-to-edge relationship with respect to the stationary platform 414 which is located laterally outwardly from the wrapping station and which extends in a side-by-side relationship with respect to the conveyor 24.

The mechanism which is used to close the opposite ends of the sleeve as the assembled package is driven along the secondary conveyor 24 includes a series of plow blades and adhesive applicators which function in a well-known manner and which will not therefore be described.

With reference to FIG. 19 of the drawings, the reference numeral 420 refers generally to the shipper package which is formed by the mechanism previously described. The wide tear tapes 136 are visible on the outer face of the package and extend circumferentially around the package in a spaced parallel relationship. The narrow tear tapes 134 directly underlie and are centrally located with respect to the wide tear tapes 136. The cuts which are made by the cutter blades 188 and 190 as shown in FIGS. 7 and 8 of the drawings are arranged so that they will extend from the edge 20c of the web along which the length of the web from which the package is formed was cut in the cutting station, these cuts 188a and 190a serve to form as enlarged V-shaped tab 420 at the end of each tear tape.

The tear tapes 136 and 134 are each formed from a binding tape of the type which has longitudinally extending reinforcing fibres which provide a substantial tensile strength. This fibrous structure does, however, increase the facility with which the tape can be torn in the lengthwise direction as any tear tends to propagate along the length of the longitudinally oriented fibre. This characteristic is used to advantage in the present structure. The enlarged tabs 420 can simply be grasped by the fingers of the user and pulled outwardly so that the inner tape will cooperate with the outer tape to sever the flexible web along tear lines which will extend along the length of the outer tape so as to leave a portion 134a of the outer tape attached to the end cap portions 422 and 424. The central tear panel 426 can then be easily removed. The tear tape portion 136a which remains on the end cap portions 422 and 424 serve to maintain the end cap portions 422 and 424 in the form of trays which will support the load items for display purposes in a retail outlet.

From the foregoing, it will be apparent that the present invention provides a mechanism which is capable of forming a shipper package from a flexible wrapping web at high speed. The shipper package itself is inexpensive and is simple to open so that it can be converted into a retail display package.

METHOD OF OPERATION

As shown in FIGS. 1 to 5 of the drawings, a coil 18 is used as the starting material for the manufacture of the wrapper. The coil 18 is positioned on the platform 30 so that its unwinding axis 39 extends transversely of the platform. The coil 18 is seated in the V-shaped notch 34 which is formed in the platform and this serves to automatically align the unwinding axis 39 of the coil 20 with the unwinding axis 46 of the web dispenser mechanism 25. The platform is then elevated and this will raise the coil to eventually cause the bore 38 of the core 40 of the coil to be aligned with the sensing axis 60 of the sensors 52,54. Thereafter, the motor which drives the elevator mechanism will continue to operate for a predetermined number of rotations of the jacking screw of the scissors mechanism which will automatically align the unwinding axes 39 and 46 regardless of the diameter of the coil. As a result, the alignment mechanism will permit a new or a partially used coil to be mounted in the web dispenser station. When the coil is aligned as described above, the rams 50 are activated to move the chucks 42 inwardly to the position shown in broken lines in FIG. 5. When in this position, the flexible tires 43 of the chucks are inflated with air to firmly grip the core. The platform is then lowered.

The web dispenser mechanism 25 is then activated to unwind the web from the coil in the direction of the arrow 86. This is achieved by activating the motor 92 which in turn drives the endless drive belt 80 so that the portion 82 thereof which bears against the perimeter of the coil will drive the coil in the direction of the arrow 86. The hold-down ram 100 serves to hold the portion 82 against the perimeter of the coil and will continuously contrast as the diameter of the coil progressively decreases. The unwinding web is threaded over the guide roller 106 and around the dancing roller 110 into the tear tape applying station 16. The web 20 extends around the rollers 116 and 118 which are located at the entrance to the tear tape applying station 16. The web 20 is then guided around the roller 120 and as shown in FIG. 6 of the drawings, the wide tear tapes 136 are applied to the outer face 20a of the web 20 as it is guided around the roller 120. The tear tapes 126 are heated as they are guided around the heated rollers 164 and 166 which also serve to press the tear tapes 136 against the surface 20a of the web 20 as it passes around the roller 120. The narrow tapes 134 are applied to the inner face 20b of the web as shown in FIG. 6 so that they are aligned with and located substantially centrally of the width of the wide tapes 136. The web 20 then passes to the notching mechanism 176 (FIG. 7a) which is activated to cut the web and the edges of the wide tape 136 to form the pull tab 420 (FIG. 20). It will be apparent that the movement of the web through the notching mechanism 174 is an intermittent movement and that prepainted register marks on the paper web serves to measure the length of web which has passed through the notching station and serves to interrupt the movement of the web so that when the notches are formed, they will extend inwardly from the trailing end of the leading end of web which is identified by the broken line 181 in FIG. 7.

The web then passes to a receptacle 20 in which one or more lengths of web are accumulated prior to entry into the wrapping station.

The web is then guided into the wrapping station and passes around the roller 226 and between the rollers 228 and 229 and between the guide plates 234 and 236. When the gripper assembly 240 is located at the starting point illustrated in FIG. 9, the ramp face 256 serves to hold the rollers 248 and 250 of the jaws 244 and 246 in the open position so that the leading end of the web an extend therebetween. To initiate the wrapping operation, the ram 262 is activated to withdraw the wedge 258 and as a result, the jaws of the gripper close and clamp the leading end of the web between the rollers 248 and 250. The slueing ring drive motor 232 is then activated and the outer ring 218 of the slueing ring is rotatably driven to drive the grippers 240 from the starting point shown in FIG. 9 to the terminal point shown in FIG. 11. The roller 228 is driven by the motor 122 (FIG. 2). Then rollers 228 and 229 cooperate with one another to feed the web to the slueing rings at a speed which is synchronized with the movement of the grippers so that the mechanism does not overfeed or underfeed paper to the wrapping station. At this point, the adhesive applicator 264 is activated so as to position the nozzles 266 above the leading end of the first length of web which is held in the grippers as shown in FIG. 11. The adhesive is then discharged form the nozzles and the nozzles are laterally displaced by activating the ram 286 so as to apply a narrow band of adhesive along the leading edge margin. Thereafter the adhesive applicator mechanism is retracted by activating the ram 298. The pad 312 is then lowered by activating the ram 316 to the position in which it bears against the mandrel 22. At this point, the blade 304 is driven downwardly so that its ramp face 306 strikes the roller 254 as shown in FIG. 14 of the drawings to open the grippers and release the leading end of the web. The ram 316 is further activated to cause the roller 318 to move downwardly to fold the leading end portion 20c around a folding edge 22a.

The pressure pad 314 is then positioned to bear against the mandrel 22 as illustrated in FIG. 14 and the cutter mechanism is activated as illustrated in FIG. 15 to cut the leading length of web from the next following length of web. The roller 322 is then elevated to fold the tailing end portion 20d over the folding edge 22b form an overlapping side seam which is extends along the side of the wrapper. Having formed a side seam, the wrapper is now in the form of a sleeve which extends around the mandrel. After the grippers release the leading end of the web, the slueing ring motor 232 is activated to rotatably drive the outer slueing ring 238 in the reverse direction to relocate the grippers at the starting point and it will be observed that as the grippers return to the starting point, the roller 254 of the moving jaw 246 will again engage the ramp face 256 to cause the jaws to move to the partially opened position so as to fit one on either side of the leading edge of the next web portion which is to be wrapped in the next wrapping cycle.

As shown in FIG. 16, a plurality of load items such as paper towels or the like are driven into the mandrel by the pusher plate 366 and come to rest against the front stop plate 370. It will be understood that the load may be partially compressed as it is driven through the tapered horn portion 634. This partial compression can be used to advantage when the load is discharged from the mandrel into the package as the load will tend to expand as it is discharged from the mandrel and this expansion will bring it into intimate contact with the wrapper thereby reducing the likelihood of relative movement between the load and the wrapper during subsequent shipping and handling. This will also serve to tighten the wrapper around the load so that the entire shipper package is more stable.

To remove the load and the sleeve from the mandrel, the sleeve stripping mechanism is advanced toward the open end of the mandrel to assume the position shown in FIG. 16. The grippers 400 are then activated to clamp opposite free edge portions of the wrapper and this entire assembly is then retracted while the pusher plate 366 is simultaneously driven forwardly. In order to support the sleeve and the load as it is transferred from the mandrel to the stationary platform 405, the transfer platform 406 is elevated to the position shown in FIG. 16. After the load has been completely discharged from the mandrel by the pusher plate 366, the resistance to further transverse movement is reduced to the extent that the load which can be applied through the grippers 400 is sufficient to pull the load across the platform 405 and onto the secondary conveyor 24. Thereafter the grippers 400 are moved to the open position shown in FIG. 18 and are further withdrawn out of the path of travel of the package as it is driven along the secondary conveyor 24 to the end closure mechanism.

The completed package is as shown in FIG. 19 of the drawings. As previously indicated, this package can be opened merely by pulling the tear strips as shown in FIG. 20 to separate the end caps 422 and 424 from the central panel 426. This permits the load to be split into two sections which are supported one on each end cap for display purposes as shown in FIG. 22.

Various modifications of the present invention will be apparent to those skilled in the art without departing from the scope of the invention. In one such modification, the gripping jaws 400 may be arranged to grip the upper and lower free end portions of the sleeve rather than the side portions illustrated in FIG. 16.

We claim:

1. A packaging machine for wrapping a flexible web around an assembled load comprising:
    (a) a wrapping station having an elongated web wrapping path extending therein along which a web is pulled from a web cutting station,
    (b) a web dispenser means for dispensing a longitudinally elongated flexible web, in the direction of its longitudinal extent, along a web feeding path which extends to the web cutting station,
    (c) a wrapping mandrel mounted in said wrapping station, said mandrel having a wrapping support face which has a longitudinal extent which extends transversely of said web wrapping path and a peripheral extent which extends in the direction of the wrapping path, said wrapping path extending around said wrapping support face, said mandrel having a load transfer passage opening therethrough, said load transfer passage extending transversely of said web wrapping path and having a discharge end opening toward a first side of said wrapping path, wrapper means mounted in said wrapping station for movement along said wrapping path,
    (d) said wrapper means being operable to grasp a leading end of a first length of an elongated flexible web and to pull said leading end along the web wrapping path to locate said first length of web in a position extending around said support face of said wrapping mandrel with a marginal edge portion of the web projecting from the discharge end of the mandrel,
    (e) web cutting means in said wrapping station for cutting the first length of web along a trailing edge thereof to separate the first length from the remainder of the web after it has been wrapped around the mandrel,
    (f) folding means in the wrapping station for folding the leading and trailing ends of the web into an overlapping position on the mandrel to form a sleeve around the mandrel,
    (g) discharge means for simultaneously discharging an accumulated load through the discharge end of the wrapping mandrel and stripping the sleeve from the mandrel such that the accumulated load is discharged into the sleeve and is transported laterally out of the wrapping path to an end closure mechanism.

2. A packaging machine as claimed in claim 1, wherein said wrapper means comprises;
    slueing ring means encircling said mandrel, said slueing ring means mounted for circumferential rotation around said mandrel.

3. A packaging machine as claimed in claim 2, wherein said slueing ring means comprises a pair of slueing rings arranged one opposite each side of said wrapping path.

4. A packaging machine as claimed in claim 3, wherein each of said slueing rings is in the form of a ring gear having gear teeth formed thereon, and wherein a slueing ring drive motor is drivingly connected to the ring gears through a power output gear which is meshed with the gear teeth of the slueing rings.

5. A packaging machine as claimed in claim 3, further comprising;
    a gripper mounted on each ring gear for movement therewith around said mandrel from a starting point proximate said cutting station through an arc of more than 270° to a termination point, said gripper being adapted to releasably grasp the leading end of the web as aforesaid.

6. A packaging machine as claimed in claim 5, wherein each gripper comprises a pair of jaws having a nip formed therebetween for grasping the web therebetween as aforesaid, said jaws being movable with respect to one another between an open position and a closed position and wherein first jaw opening means is located proximate said starting point to open the jaws to admit the leading end of the web, and second jaw opening means is located proximate said termination point to open the jaws to release the leading end of the web.

7. A packaging machine as claimed in claim 5, further comprising web guide means extending along the web feeding path into close proximity to the web cutting station to support the leading end of successive lengths of web in alignment with the nip of the jaws of a gripper located at said starting point.

8. A packaging machine as claimed in claim 2, wherein said mandrel is located coaxially with said slueing ring means.

9. A packaging machine as claimed in claim 2, wherein said discharge means comprises second gripper means for gripping said marginal edge portion of the web and means for moving the second gripper means toward and away from the discharge end of the mandrel to engage and then pull the sleeve off of the mandrel.

10. A packaging machine as claimed in claim 1, wherein the wrapping mandrel has a rectangular cross-section.

11. A packaging machine as claimed in claim 5, further comprising means in the wrapping station for applying an adhesive to the leading end of the web when said grippers are located at said termination point.

12. A packaging machine as claimed in claim 11, wherein said means for applying an adhesive to the leading end of the web comprises;
- a first carriage mounted for movement into and out of said wrapping station,
- a second carriage mounted for movement along said first carriage in the direction of the longitudinal extent of the mandrel,
- a plurality of adhesive spray nozzles mounted on said second carriage for movement therewith, said spray nozzles being operable to apply a narrow band of adhesive to the leading end of a web as aforesaid.

13. A packaging machine as claimed in claim 11, wherein said folding means comprises;
- clamping means for releasably clamping a web against the mandrel to retain the web against movement with respect to the mandrel,
- a first folding roller mounted for movement with respect to said mandrel and arranged to fold the leading end portion of a web into a face-to-face relationship with the mandrel, and
- a second folding roller mounted for movement with respect to the mandrel and arranged to fold the trailing end portion of the web into an overlying relationship with respect to the leading end portion.

14. A packaging machine as claimed in claim 1, for use with a web as previously described which has and outer face and an inner face, said machine further comprising;
- first tape applying means located along said web feeding path for applying a first tear strip tape onto the outer face of said web in the direction of the longitudinal extent of the web,
- second tape applying means located along said web feeding path for applying a second tear strip tape onto the inner face of said web in the direction of the longitudinal extent of the web such that the second tape lies directly under the first tape.

15. A packaging machine as claimed in claim 1, for use with a web as previously described which has an outer face and an inner face, said machine further comprising;
- a pair of first tape applying means located along said web feeding path for applying a pair of spaced parallel first tear strip tapes onto the outer face of said web in the direction of the longitudinal extent of the web,
- a pair of second tape applying means located along said web feeding path for applying a pair of spaced parallel second tear strip tapes onto the inner face of said web in the direction of the longitudinal extent of the web such that each second tape lies directly under a first tape.

16. A packaging machine as claimed in claim 14, further comprising cutter blade means mounted above the feeding path between the tape dispenser and the wrapping path for movement toward and away form the feeding path to form short cuts in the web and opposite side edges of the second tab to provide finger access to the edges of tapes.

17. A packaging machine as claimed in claim 14, further comprising;
- a tape dispenser for each tape applying means, said tape dispenser means being located laterally outwardly from one side of said feeding path, and
- guide roller means for guiding each tape from its dispenser means to its applying means.

18. A packaging machine as claimed in claim 1, further comprising:
- a discharge platform located at the discharge end of the load transfer passage of the mandrel and means for raising and lowering said platform between a lowered position in which it is located out of and below said wrapping path and a raised position in which it forms an underlying support for a sleeve and its load as they are transported laterally as aforesaid.

19. A packaging machine as claimed in claim 1, further comprising;
- a discharge carriage located laterally outwardly from the wrapping station and mounted for movement toward and away from the discharge end of the mandrel,
- a support member mounted on the discharge carriage for movement therewith,
- second gripper means mounted on said support member for gripping said marginal edge portion of the web and pulling the sleeve off of the web in response to movement of the discharge carriage away from the mandrel.

20. A packaging machine as claimed in claim 1, further comprising;
- a dispenser mechanism for unwinding and dispensing a web of flexible material from a coil of said material which has a winding axis about which the coil is wound and a hollow core which is coaxial with the winding axis comprising;
  (i) a coil unwinding station from which a coil is unwound along said web feeding path,
  (ii) coil support means in said unwinding station, said coil support means having an unwinding axis, said coil support means being capable of supporting a coil in an elevated position with the winding axis of the coil aligned with said unwinding axis for unwinding rotation thereon,
  (iii) unwinding belt means having a forward run portion arranged to bear against an arcuate portion of the perimeter of a coil which is mounted on said support means in use,
  (iv) belt support means supporting said unwinding belt for movement of the forward run portion toward and away from said unwinding axis,
  (v) biasing means normally biasing the belt support means toward said unwinding axis to maintain driving contact between the forward run of the belt and the perimeter of the coil as the diameter of the coil progressively decreases in use,
  (vi) drive means for driving the unwinding belt.

21. A packaging machine as claimed in claim 20, wherein said dispenser mechanism further comprises;
a loading platform located below said coil support means,
elevator means for raising and lowering said loading platform such that the platform may be lowered to receive a coil and raised to lift a coil to align the winding axis of the coil with the unwinding axis of the coil support means.

22. A packaging machine as claimed in claim 21, wherein said dispenser mechanism further comprises;
sensor means for detecting the alignment of the hollow core of a coil resting on the platform with a predetermined reference point which is located below said unwinding axis,
said sensor means being operable to interrupt the operation of the elevator means after the platform is raised a sufficient distance to move the core of said coil from said reference point to a position in which it is aligned with said unwinding axis whereby a coil can be aligned with respect to the unwinding axis without regard to the diameter of the coil to facilitate the use of partially used coils.

23. A packaging machine as claimed in claim 20, wherein said coil support means comprises a pair of chuck members which are mounted one on either side of said unwinding station, said chuck members each having an axis of rotation which is aligned with said unwinding axis and being mounted for axial movement toward and away from the unwinding station so as to enter and withdraw from the hollow core of a coil which is aligned therewith in use.

24. A packaging machine as claimed in claim 2, wherein said slueing ring means is detachably mounted on said packaging machine so as to be easily removable 25. A packaging machine as claimed in claim 24, wherein each slueing ring has an annular mounting channel formed along one side face thereof within which retaining guide rollers are mounted which releaseably retain the slueing ring in a position in which it is coaxial with the mandrel during rotation about the mandrel.

* * * * *